July 10, 1962  E. O. ENGELS  3,043,244
DOUGH STRETCHING APPARATUS
Filed May 2, 1960  4 Sheets-Sheet 3
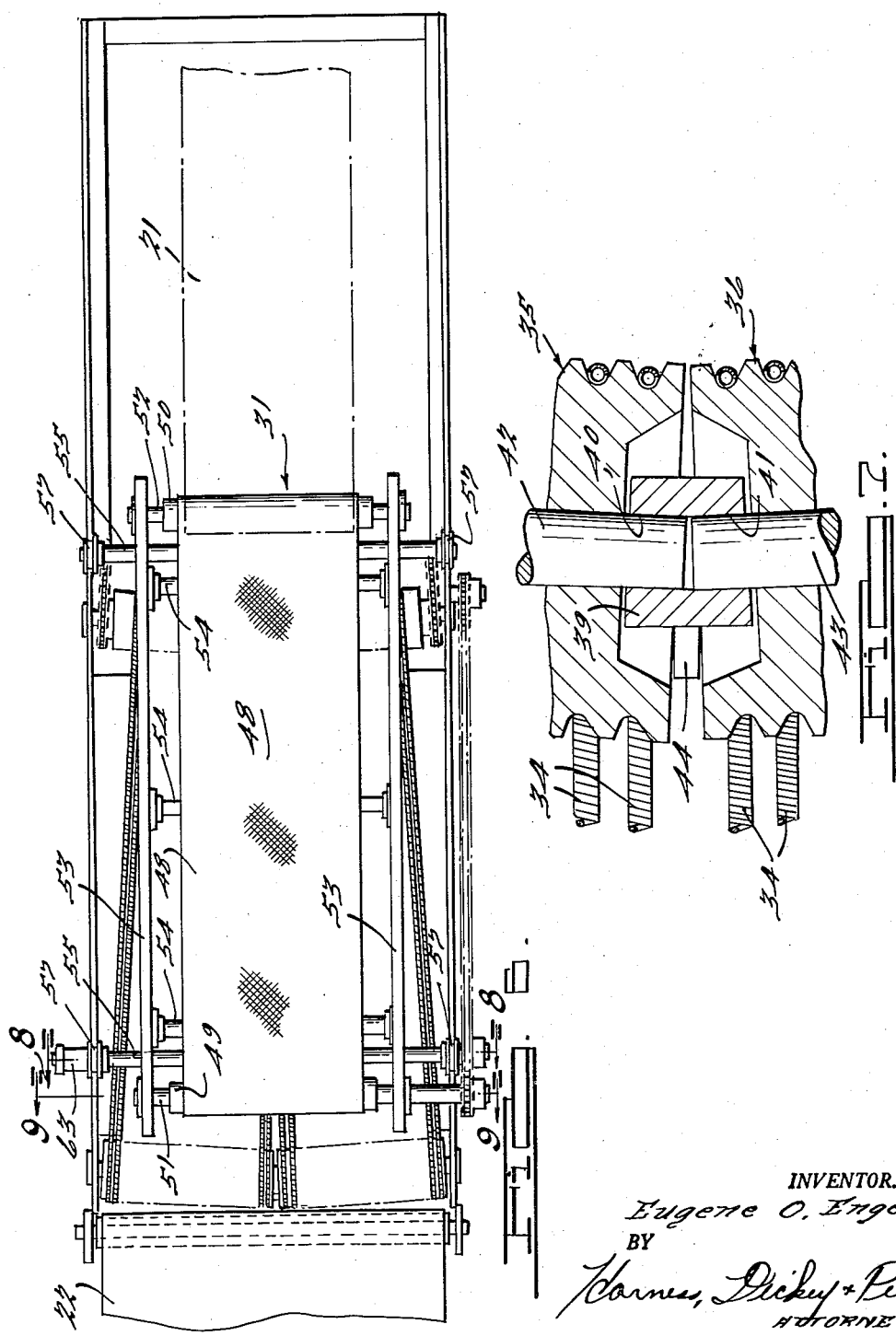
INVENTOR.
Eugene O. Engels
BY
Harness, Dickey & Pierce
ATTORNEYS.

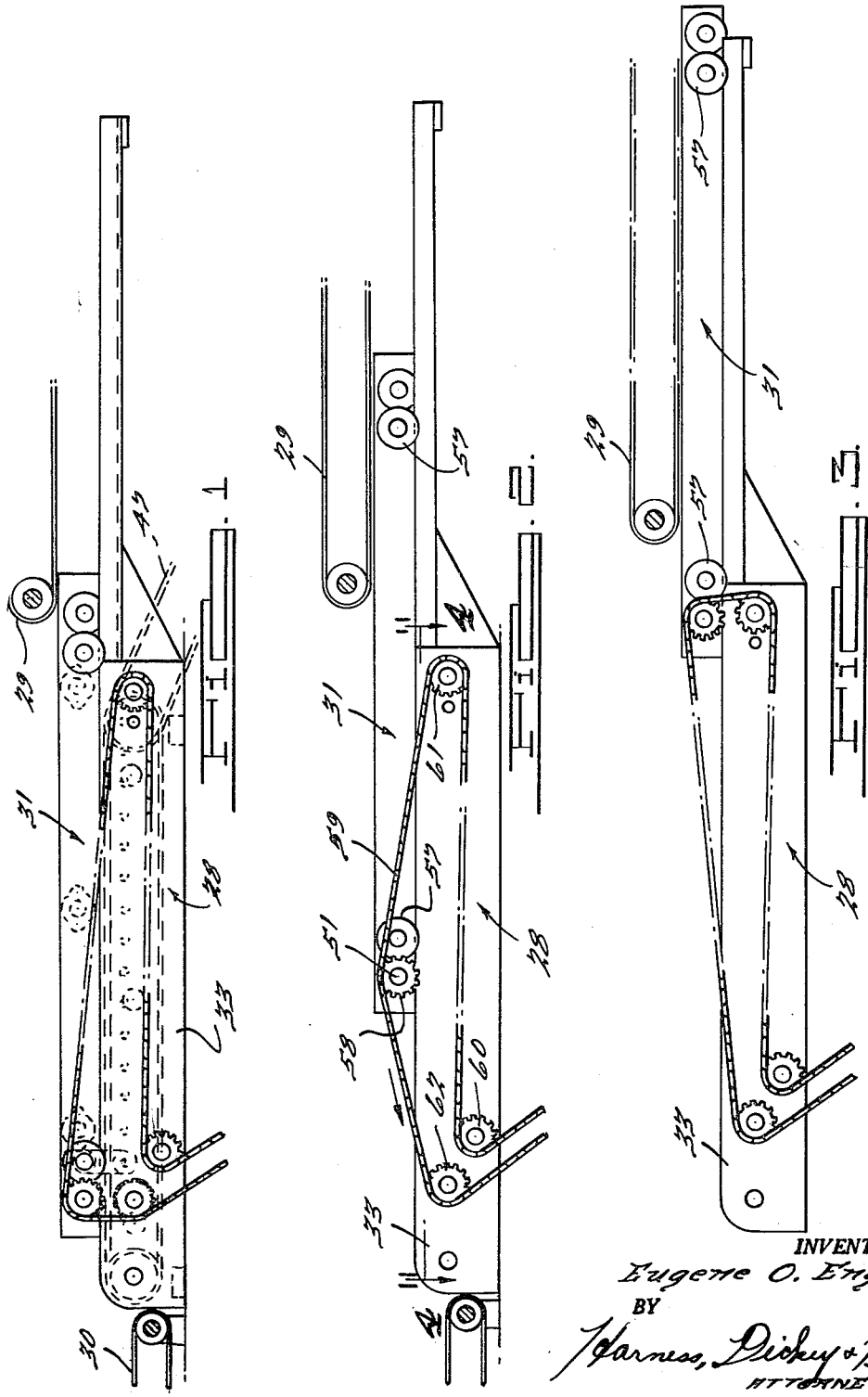

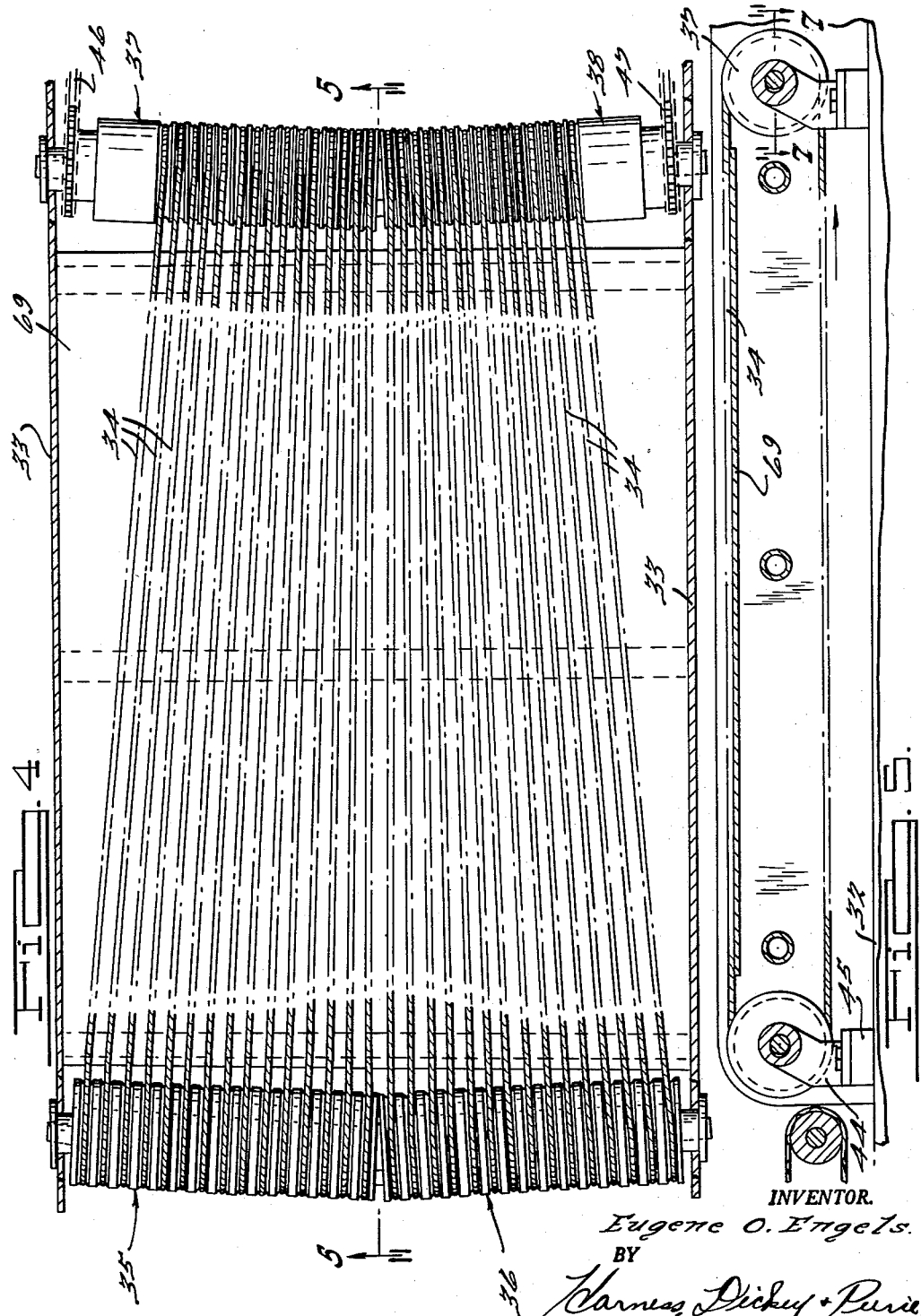

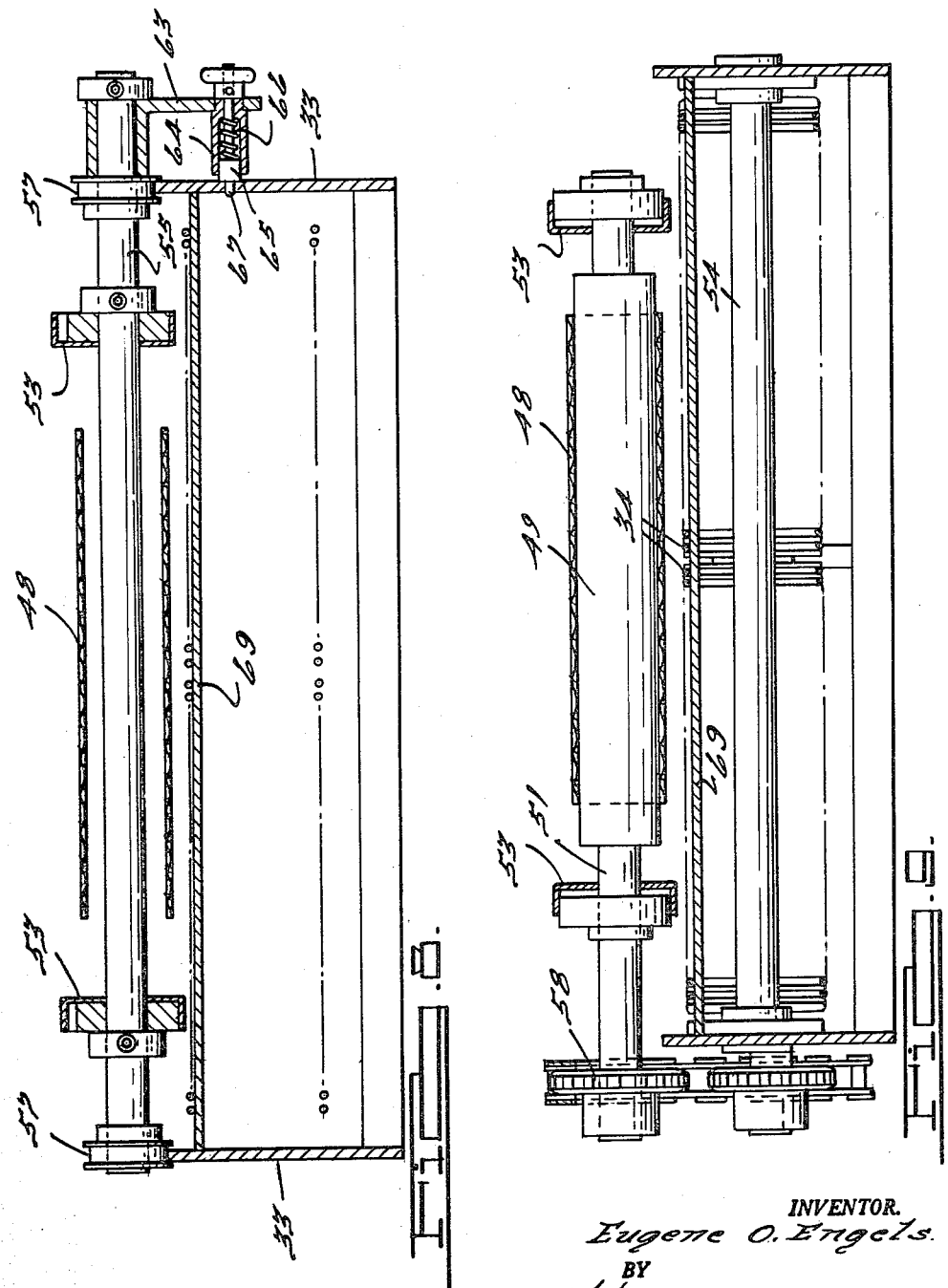

United States Patent Office 3,043,244
Patented July 10, 1962

3,043,244
DOUGH STRETCHING APPARATUS
Eugene O. Engels, 423 Brockway Place, Saginaw, Mich.
Filed May 2, 1960, Ser. No. 26,116
3 Claims. (Cl. 107—9)

The present invention relates to apparatus for stretching dough pieces and is of a type peculiarly suited for use use in automatic bread making plants.

In the manufacture of bread by automatic machinery, it is the conventional practice to roll a lump of proofed dough into a sheet and then, on a so-called "molding conveyor," coil the sheet into a cylindrical coil for deposit in the bread pans. After the dough is coiled and before it is placed in the pans, it is usually desirable to roll the coiled dough beneath a plate or pressure board for the purpose of sealing the edges. In addition, it is generally necessary to extend or increase the length of the coil of dough in order to make it fit the pan. In the past, this has been done by applying sufficient pressure on the pressure board to squeeze the dough out longitudinally as it is rolled between the molding conveyor and the pressure board. While the pressure board has been widely used for this purpose, it is subject to the defect that it imposes upon the dough piece an excessive degree of mechanical working which tends to rupture the dough and impair its character if it is used to extend the dough piece longitudinally. This difficulty increases as the diameter of the coil of dough increases and also in proportion to the amount of longitudinal stretching or extension required.

While in the manual making of bread it is possible for skilled bakers to stretch a dough piece to the proper length by manual manipulation, this is not practical in high speed mechanical bread making operations and no satisfactory method has been devised to solve the problem. In the absence of a solution to the problem, it has been the practice to go to considerable trouble to produce a dough piece of the right dimensions so that the coil will fit the pan with a minimum of stretching under the pressure board. When this can be done, satisfactory results are achieved, but it is not always feasible nor is it easily achieved. Another expedient employed is to form a loaf by twisting two slender coils of dough to produce so-called "twist" bread. In this case, the fact that each of the two coils is quite slender minimizes the severity of the working under the pressure board. This expedient is however more complicated and expensive since it requires twice as many pieces of dough and further requires an automatic dough piecetwisting mechanism.

Accordingly, it is the object of the present invention to devise apparatus for effectively stretching a dough piece to a desired longitudinal dimension which does not involve any excessive working of the dough piece and yet uniformly or otherwise stretches each portion of the dough piece to the desired degree.

Another object of the invention is to provide apparatus of the type mentioned which is easily adjusted so that it will extend or stretch dough pieces to any desired degree within relatively wide limits.

Another object of the present invention is to provide an apparatus of the type mentioned which is simple and inexpensive in construction and capable of being operated at any desired speed to accommodate the production rate of any automatic bread making plant.

In the drawings:
FIGS. 1, 2, and 3 are side elevational views of a preferred form of the invention showing an auxiliary infeed conveyor in three different positions of adjustment;
FIG. 4 is a sectional view taken on the line 4—4 of FIG. 2;
FIG. 5 is a sectional view taken on the line 5—5 of FIG. 4;
FIG. 6 is a plan view of the apparatus with the parts in the position illustrated in FIG. 1;
FIG. 7 is a fragmentary section taken on the line 7—7 of FIG. 5;
FIG. 8 is a transverse section taken on the line 8—8 of FIG. 6; and
FIG. 9 is a transverse section taken on the line 9—9 of FIG. 6.

Referring to the drawings, the apparatus consists of a special form of conveying means indicated generally by the numeral 28 which is adapted to receive a sheet or coil of bread dough from a conveyor 29 which may be the molding conveyor and deliver it directly to the bread pans or to an intermediate conveyor 30 which in turn delivers the dough piece to a bread pan.

It is preferred that the apparatus be used to stretch a dough piece after it has been coiled into a cylindrical coil by a conventional coiling mechanism. If the coiled dough is to be sealed by passing it or rolling it between a molding conveyor and a pressure board, this operation should be done prior to discharge of the coiled dough piece from the infeed conveyor system onto the stretching unit 28. However, care should be taken to minimize the pressure exerted by the pressure board during the sealing operation in order to avoid rupturing the dough piece. This is possible when the apparatus of the present invention is employed because it is not necessary for the pressure board to extend or stretch the dough piece.

As an alternative arrangement, the unit 28 may be used to stretch sheeted dough pieces prior to the coiling operation, in which event flat sheets of dough are discharged by the infeed conveyor system directly onto the unit 28 and are stretched in a direction transversely thereof. Thereafter, they are deposited on conveyor 30 where they are coiled and subsequently deposited in the bread pans.

Referring to FIG. 1, the apparatus there shown includes a stretching unit indicated generally by the numeral 28, an infeed or molding conveyor 29, a discharge conveyor 30 and an auxiliary infeed conveyor mechanism indicated generally at 31. As best shown in FIG. 4, the stretching conveyor unit 28 includes a base member 32 having upstanding side frames 33 between which a plurality of narrow spaced diverging belts 34 are positioned. At each end of the belts 34 there are provided two drums indicated generally at 35, 36, 37 and 38. The drums 35 and 36 are positioned at one end of the unit and are disposed in an end-to-end relationship but are angularly related with respect to each other as best shown in FIG. 4. The inner ends of the drums 35 and 36 are journaled on a bearing element 39 which has a pair of generally aligned but angularly disposed bores 40 and 41 which receive, respectively, the ends of the shaft 42 of drum 35 and shaft 43 of drum 36, as shown in FIG. 7. The bearing element 39 is supported on the base by means of an upstanding bracket arm 44 and a supporting block 45 which rests directly upon the base 32. The outer ends of the drums 35 and 36 are journaled by means of bearings carried by the side frame members 33 which receive the outer ends of the shafts 42 and 43.

The drums 37 and 38 which support the other ends of the belts 34 are similarly constructed and mounted except that they are driven by chains 46 and 47 from any suitable power source and have the belt receiving grooves therein more closely spaced than the corresponding grooves in the drums 35 and 36. As a result of this arrangement, it will be observed that although only four drums are used, it is possible to provide an adequate rate of divergence with an assembly of relatively closely spaced belts. Moreover, the use of the two drums 35 and 36 is a simple and inexpensive construction compared for example to individual caster-mounted pulleys.

While two drums 37 and 38 are shown at the right-hand end of the apparatus illustrated in FIGS. 4 and 5, it will be apparent that in place of these two drums a single solid drum may be employed so long as the angular approach of the belts 34 to the single drum at the bottom is not so great as to cause the belt to climb out of its groove. This arrangement of a single drum has the advantage over the dual drums 37 and 38 not only of simplicity but it permits a closer spacing of the two centralmost belts at their right-hand ends and thus permits a more uniform spacing of the belts at the right-hand end than might otherwise be possible.

In order to adjust the mechanism to perform varying amounts of stretching, means are provided for depositing the dough pieces on the stretching unit 28 at various points along its length. This means, as best shown in FIGS. 1, 2, 3, 6, 8, and 9, comprises an auxiliary infeed conveyor 31 comprising a conveyor belt 48 carried by a pair of drums 49 and 50 mounted, respectively, on shafts 51 and 52 which are journaled in a pair of side frame members 53. The side frame members are fixed in spaced relation to each other by a plurality of cross members 54. Also fixed to the side frame members 53 and projecting laterally therefrom are a pair of transverse shafts 55, on the outer ends of which are positioned groove rollers 57 which run on the top edges of the side frame members 53 as a track and thereby permit the auxiliary infeed conveyor unit 31 to move longitudinally along and above the stretching unit 28. It will be observed from FIGS. 1–3, inclusive, that the auxiliary infeed conveyor 31 is also positioned to pass beneath the infeed conveyor 29 when it is retracted to the right. The conveyor belt 48 is driven by a sprocket 58 on the end of shaft 51 which engages a drive chain 59. The drive chain 59 from a suitable power source (not shown) passes upwardly and around an idler sprocket 60, a second idler sprocket 61, thence over sprocket 58 and a third idler sprocket 62, whereupon it returns to the power source. With this arrangement it will be observed that the chain 59 will drive the auxiliary infeed conveyor 48 in all positions of the auxiliary infeed conveying unit 31 with very little change in the over-all length of the chain 59. Such minor changes in length as are required to accommodate this movement may be provided by a conventional chain slack take-up mechanism (not shown).

Means are provided for locking the auxiliary infeed conveyor in any desired adjusted position. This means comprises an arm 63 journaled on one end of shaft 55 and carrying a housing 64 in which is positioned a plunger 65 urged by a spring 66 in a direction to project its end 67 in any one of a plurality of openings 68 formed in the right-hand side frame member 33, as viewed in FIG. 8.

In order to prevent or limit sagging of the belts 34 and to limit sagging of the dough piece between the belts, there is provided a plate 69 which underlies the top run of all the belts 34, and normally either contacts the belts or is spaced a minute distance below their running position when not under load. The plate 69 is preferably formed of a smooth material having a very low coefficient of friction. While a smooth metallic plate such as stainless steel or chrome-plated metal may be employed, it is preferred to use a plate having a plastic or resinous coating which will not only offer minimum frictional resistance but also resist adherence to the dough pieces. Suitable materials of this type are: polytetrafluoroethylene (Teflon); polymonochlorotrifluoroethylene (Kell–F); polymerized hexamethylene diamine salt of adipic acid (Nylon); and other resins.

It will be apparent that maximum stretching or extending of the dough piece will be provided when the auxiliary infeed conveyor is in the position shown in FIG. 3, while minimum stretching will be effected when it is in the position shown in FIG. 1. Any intermediate degree of stretching may be effected by intermediate positions.

By the present invention, it is possible to perform the stretching operation with a minimum working or damage to the dough piece and at a high rate of speed since the speed of the stretching conveyor units may be set at any level necessary to match the production rate of the remaining bread making equipment. There is, however, some advantage in performing the stretching function over a significant period of time—in other words, it is better to stretch slowly than rapidly. This may be achieved by simply making the stretching conveyor section long enough to provide whatever time is required at whatever speed of production is desired.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. Apparatus for stretching dough pieces comprising a conveyor on which the dough pieces may be deposited and conveyed in a direction at right angles to the direction of desired stretching, said conveyor consisting of a plurality of individual narrow belts which extend in spaced relation in generally the same direction with at least certain of said belts diverging from each other in the direction of travel of the dough pieces supported thereon, and conveying means for depositing dough pieces on said stretching conveyor and including a discharge section movable longitudinally of the stretching conveyor in order to adjust the point along the length of the stretching conveyor at which the dough pieces are deposited in order to adjust the total amount of stretching performed.

2. Apparatus for stretching dough pieces comprising a conveyor on which the dough pieces may be deposited and conveyed in a direction at right angles to the direction of desired stretching, said conveyor consisting of a plurality of individual narrow belts which extend in spaced relation in generally the same direction with at least certain of said belts diverging from each other in the direction of travel of the dough pieces supported thereon, the individual belts being of such width and the belts being so spaced that they will indent into the dough piece sufficiently to resist slipping of the dough piece transversely of the belt, and conveying means for depositing dough pieces on said stretching conveyor and including a discharge section movable longitudinally of the stretching conveyor in order to adjust the point along the length of the stretching conveyor at which the dough pieces are deposited in order to adjust the total amount of stretching performed.

3. Apparatus for stretching dough pieces comprising a conveyor on which the dough pieces may be deposited and conveyed in a direction at right angles to the direction of desired stretching, said conveyor consisting of a plurality of individual narrow belts which extend in spaced relation in generally the same direction with at least certain of said belts diverging from each other in the direction of travel of the dough pieces supported thereon, a stationary supporting plate of antifriction characteristics positioned beneath the dough piece supporting run of said belts to limit sagging of the belts and limit sagging of the dough pieces, and conveying means for depositing dough pieces on said stretching conveyor and including a discharge section movable longitudinally of the stretching conveyor in order to adjust the point along the length of the stretching conveyor at which the dough pieces are deposited in order to adjust the total amount of stretching performed.

References Cited in the file of this patent

UNITED STATES PATENTS

| | | |
|---|---|---|
| 1,938,110 | Neutelings | Dec. 5, 1933 |
| 2,293,109 | Bridge | Aug. 18, 1942 |
| 2,843,983 | Archer | July 22, 1958 |
| 2,892,422 | Casale | June 30, 1959 |
| 2,924,184 | Welch | Feb. 9, 1960 |

OTHER REFERENCES

Cementable Teflon, Mechanical Engineering, page 73, October 1956.